United States Patent Office 3,226,346
Patented Dec. 28, 1965

3,226,346
EXPANDABLE COMPOSITION COMPRISING A THERMOPLASTIC RESIN AND A UREA-FORMALDEHYDE-HYDROGEN PEROXIDE REACTION PRODUCT AND PROCESS OF FOAMING SAME
Louis L. Wood, Clarksville, Md., assignor to W. R. Grace & Co., a corporation of Connecticut
No Drawing. Filed Dec. 17, 1962, Ser. No. 244,953
5 Claims. (Cl. 260—2.5)

The present invention relates to the production of foamed synthetic resins, and more specifically to a novel blowing agent for the expansion of synthetic resins and to a method for its use.

In recent years, foamed synthetic resins have become increasingly important articles of commerce. These resins are produced by various methods such as direct gas entrainment, incorporation and expansion of a low boiling liquid, and use of chemically decomposable gas liberating compound i.e. chemical blowing agent. The present invention is concerned with the last mentioned type of method.

There are many requirements which must be met by a thermally activated chemical blowing agent. It must be capable of being incorporated in the resin to be expanded, that is, it must be chemically compatible with the resin and be sufficiently stable to withstand blending operations and reasonable periods of storage. Furthermore, the blowing agents should not cause discoloration of the resin nor should it cause chemical decomposition thereof. Still further, a blowing agent should be capable of liberating a high volume of gas for a given weight thereof, and it should be sufficiently inexpensive and easy to handle to make it commercially useful. Prior art blowing agents frequently fall considerably short of these criteria.

It is therefore an object of the present invention to provide an improved blowing agent for synthetic resins.

It is another object to provide a method by which the synthetic resins may be foamed using the blowing agent disclosed herein.

It is a further object to provide a thermally activated chemical blowing agent which is inexpensive, compatible with synthetic resins, and liberates a high volume of gas per unit weight.

These and still further objects of the present invention will become readily apparent from the following detailed description and specific examples.

Broadly, the present invention contemplates the use of a urea-formaldehyde-hydrogen peroxide reaction product (herein designated as UFP) as a blowing agent for synthetic resins. Thus UFP product is known to the art and was initially disclosed by Griswald and Siegens in Berichte 47, pages 2464–9 (1914) and also in Berichte 54B, 492–8 (1921). While the precise chemical structure of the UFP product is not known, it possesses the empirical formula $C_3H_6N_2O_3$, and may be readily prepared by reacting urea, formaldehyde, and hydrogenperoxide in the presence of concentrated (70–71%) nitric acid. The desired product is a white crystalline compound which melts with decomposition at 200° C. and may be readily obtained in good yield using methods given in the above literature references and elsewhere in the literature.

More specifically, I have found that if from about 0.5 to about 20% by weight of the above defined UFP product is incorporated in a thermoplastic synthetic resin, and the resin-UFP mixture is then heated to a temperature above about 180° C., the UFP product rapidly and uniformly liberates gas in a manner which will produce a homogeneously foamed resin. By varying the amount of UFP incorporated in the resins within the above general limits, foamed products may be obtained which possesses a volume of from about 1.5 to about 6 times as great as the volume of the initial resin.

Resins in which the present UFP compounds may be effectively incorporated are thermoplastic resins such as polyethylene having a density of from about 0.92 to about 0.96 and a melt index of from about 0 to about 50, polypropylene, and polystyrene.

The manner in which the present UFP blowing agent is incorporated in the resin will depend upon the characteristics of the particular resin used. For solid thermoplastic resins such as polyethylene, a preferred method involves heating the resin to a softening temperature which is below that of the UFP decomposition temperature (180° C.), and hot blending the UFP compound intimately with the resin using appropriate mechanical mixing.

Subsequent to blending, the resin-UFP mixture is then preferably reduced to a particulate form. The resin particles containing the UFP blowing agent may then be subjected to conventional molding processes which are conducted under temperatures in excess of the 180° C. required to decompose the UFP compound.

The present resins containing the UFP blowing agent may be processed in any conventional manner. Typical molding procedures include hot continuous extrusion as well as both open and closed molding techniques wherein temperatures in excess of about 180° C. are used.

Having described the essential aspects of the present invention, the following detailed specific example is given to illustrate an embodiment thereof.

*Example*

A 10 g. sample of polyethylene having a melt index of 5.0 in the form of 60 mesh powder was dry blended with 0.5 g. of UFP powder. To complete the blending, the mixture was pressed at 1,000 pounds per square inch and 140° C. for 45 seconds to form a continuous 10 mil thick film. This film possessed very few bubbles. The film was then ground into small particles. 1.2 g. of the ground product was then placed in a 3 x 25 x 50 ml. rectangular mold and heated to 200° C. for 2 minutes whereupon a tough foamed polyethylene structure having the same dimensions as the mold and weighing 1.2 g. was obtained. An object having identical dimensions using an unexpanded sample of the same polyethylene possessed a weight of 3.3 g.

The above example clearly indicates that the herein contemplated UFP compounds are effective blowing agents of thermoplastic resins.

I claim:
1. A thermally expandable resin composition which comprises a thermoplastic resin having a softening point of below about 180° C., and from about 0.5 to about 20% by weight of a urea-formaldehyde-hydrogen peroxide reaction product blowing agent, said reaction product being characterized by the following characteristics: (1) an empirical formula $C_3H_6N_2O_3$; (2) a decomposition-melting point of 200° C.; and (3) a white crystalline appearance.
2. The composition of claim 1 wherein the resin is polyethylene.
3. The method of forming expanded synthetic resins which comprises incorporating from about 0.5 to about 20% by weight the blowing agent defined in claim 1, in a thermoplastic resin having a softening point below about 180° C., and subjecting the resin-blowing agent composition to a temperature in excess of about 180° C. to cause thermal decomposition of said blowing agent and the expansion of said resin.
4. The method of claim 3 wherein the resin is polyethylene.
5. A method for foaming polyethylene which comprises heating polyethylene to a temperature of from about 150 to about 200° C. to cause softening thereof, blending said softened polyethylene with a urea formaldehyde-hydrogen peroxide blowing agent, said reaction product being characterized by the following characteristics: (1) an empirical formula $C_3H_6N_2O_3$; (2) a decomposition-melting point of 200° C.; and (3) a white crystalline appearance cooling said blend to below the hardening temperature thereof, milling said blend to obtain a particulate product, and subjecting said particulate product to a temperature in excess of about 180° C. to obtain decomposition of said blowing agent and foaming of said polyethylene.

References Cited by the Examiner

UNITED STATES PATENTS

| | | | |
|---|---|---|---|
| 2,376,653 | 5/1945 | Boyer | 260—2.5 |
| 2,804,435 | 8/1957 | Reed | 260—2.5 |
| 2,891,017 | 6/1959 | Kern et al. | 260—2.5 |
| 2,946,095 | 7/1960 | Beer | 260—2.5 |
| 3,017,371 | 1/1962 | Hohenberg et al. | 260—2.5 |
| 3,098,831 | 7/1963 | Carr | 260—2.5 |

OTHER REFERENCES

Griswald et al.: Berichte 47, pages 2464–9 (1914).
Griswald et al.: Berichte 54B, pages 492–8 (1921).

MURRAY TILLMAN, *Primary Examiner.*

JAMES A. SEIDLECK, *Examiner.*

M. FOELAK, *Assistant Examiner.*